United States Patent

Watanabe et al.

[11] Patent Number: 5,905,764
[45] Date of Patent: May 18, 1999

[54] RADIO RECEIVER

[75] Inventors: Hidekazu Watanabe, Tokyo, Japan; Seiichi Izumi, Fellbach; Hamid Amir-Alikhani, Leonber, both of Germany

[73] Assignees: Sony Corporation, Tokyo, Japan; Sony United Kingdom Limited, Weybridge, United Kingdom

[21] Appl. No.: 08/796,068

[22] Filed: Feb. 4, 1997

[30] Foreign Application Priority Data

Jan. 30, 1996 [GB] United Kingdom .................... 9601768

[51] Int. Cl.$^6$ .......................... H04L 27/06; H04L 27/22; H04L 7/00
[52] U.S. Cl. .......................... 375/341; 375/324; 375/371
[58] Field of Search .................... 375/341, 340, 375/362, 371, 344, 316, 354, 329, 332, 326, 324; 370/503; 371/43.6, 43.7, 43.8

[56] References Cited

U.S. PATENT DOCUMENTS

| | | | |
|---|---|---|---|
| 4,578,800 | 3/1986 | Yasuda et al. | 375/371 |
| 5,710,792 | 1/1998 | Fukawa et al. | 375/232 |
| 5,724,394 | 3/1998 | Ikeda et al. | 375/341 |
| 5,729,558 | 3/1998 | Mobin | 375/341 |

FOREIGN PATENT DOCUMENTS 0 618 687  10/1994  European Pat. Off. .

OTHER PUBLICATIONS

Patent Abstracts of Japan vol. 018, No. 675 (E–1648), Dec. 20, 1994 of JP 06 268540 A (Fujitsu Ltd), Sep. 22, 1994.

Primary Examiner—Stephen Chin
Assistant Examiner—Betsy L. Deppe
Attorney, Agent, or Firm—Frommer Lawrence & Haug, LLP.; Willam S. Frommer

[57] ABSTRACT

A radio receiver for a digital cellular system or the like corrects a doppler frequency shift with a simple arrangement. A phase difference of received data I,Q is corrected by generating an estimated signal EXn through estimation of the received data I,Q corresponding to transmitted data y estimated for the maximum likelihood by a maximum likelihood determination circuit 25, by detecting the branch metric BM, BM+, or BM– in which the estimated data is in phase with the received signal, or in the leading or trailing phase to the received signal, respectively, by detecting the phase difference of the received data I,Q from the estimated signal EXn based on the result of comparison of the branch metrics BM+, BM, and BM–, and by correcting the phase difference based on the result of detection of the phase difference.

5 Claims, 7 Drawing Sheets

RADIO RECEIVER

BACKGROUND OF THE INVENTION

1. Field of the Invention

This invention relates to a radio receiver, and is applicable for example, to a digital cellular system transmitting and receiving voice signals by coding them.

2. Description of the Related Art

Conventionally, a digital cellular system, which is a kind of radiotelephony, is designed to allow a plurality of terminals to simultaneously use one channel through a time division multiplex approach by coding voice signals for transmitting and receiving.

That is, when it is turned on, such a type of terminal sequentially scans received frequencies in a predetermined number of channels, for example, 124 channels, and detects a FCCH (frequency correction channel) which is inserted in the channel at a predetermined cycle (typically, consisting of 10 or 11 frames) in order stronger field strength, to recognize the channel including the FCCH as control channel.

Then, the terminal detects and receives a control channel assigned to the area to which it belongs.

The control channel is designed to form a time slot for transmission of various information, whereby, in the digital cellular system, each terminal receives the control channel to receive information such as information on a base station sending the control channel, information on an adjacent base station, and information for calling the terminal.

To this end, the terminal corrects the processing timing based on this FCCH.

Here, the FCCH is a synchronizing signal assigned with a bit pattern in which, when it is decoded, data of value "0" continues for a predetermined number of bits. In the digital cellular system, the bit pattern is differential coded and then GMSK (Gaussian filtered minimum shift keying) modulated for transmission.

Thus, the digital cellular system detects this FCCH, and roughly synchronizes the entire operation based on the result of this detection (that is, frame synchronization).

At the completion of frame synchronization, such a type of terminal corrects the deviation of frequency of its internal clock to the base station based on the FCCH, and then finely synchronizes the entire operation based on the subsequent predetermined reference signal.

When a state ready for receiving the control channel is thus established, the terminal receives control data sent from the base station by receiving the time slot assigned to it, and switches the transmission/receiving frequency from the control channel to a call channel, as required.

Then, the terminal transmits or receives a voice signal to or from a called station by using this call channel.

At the moment, the digital cellular system is designed to add an error correction code to the data to be transmitted, and sends out the data after performing differential coding and GMSK modulation, whereby stable communication can be assured.

Such a type of terminal may be used on a car or the like. In such a case, the terminal moves at a high speed in respect to the base station.

In this case, assuming that the relative moving speed between the terminal station and the base station is "v", and the transmission carrier frequency of the digital cellular is "λ", the transmitted/received signal is doppler shifted by a frequency $f_{dp}$ as represented by the following equation:

$$f_{dp} = v/\lambda \tag{1}$$

Figure 1:
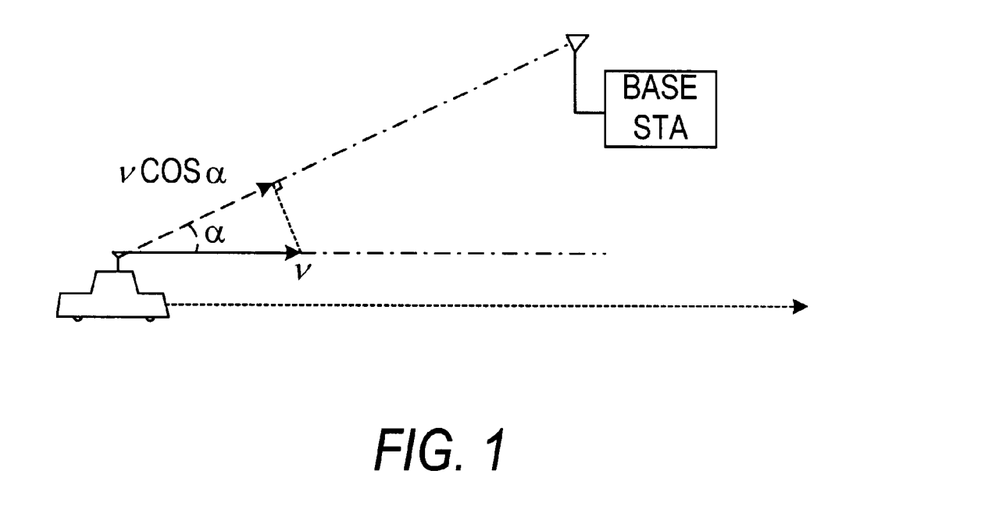
FIG. 1 is a is a schematic diagram for explaining the doppler frequency shift.

As shown in FIG. 1, if the mobile station with a terminal on board is moving in respect to the base station with an angle α, the equation (1) is represented by:

$$Fdp\phi = \frac{v \times \cos\alpha}{\lambda} \tag{2}$$

In this case, because the carrier frequency is selected for about 950 MHz in the digital cellular system, when the terminal moves at 250 km per hour with respect to the base station, this relationship is substituted for equation (2), thereby finding that the received signal is doppler shifted in frequency by 220 Hz at the maximum.

Such a doppler frequency shift is observed at the terminal as a deviation of the carrier frequency, resulting in a reduction of the decoding efficiency when demodulating the data and deterioration of the bit error rate for the entire terminal.

In such a case, an approach may be possible to correct the doppler shifted carrier frequency based on the above-mentioned FCCH. However, because the amount of the doppler shift varies depending on the moving speed of the terminal, the doppler shift may not be properly corrected in correspondence with the variation in the amount of shift if based on the FCCH which is intermittently inserted in the control channel.

Particularly, when the terminal moves as in the above, fading may often be caused as well. In such a case, the level and phase of the received signal simultaneously vary so that the correction of doppler shift becomes difficult.

On the other hand, a method has been proposed in which received data is stored once in a predetermined storage means, the amount of frequency shift being estimated based on the stored data, the frequency shift being corrected with the result of the estimate (The Transactions of IECE Japan, B-11, Vol.J73-8-11, No. 11, pp. 736–744, November 1990). This method causes the entire configuration to be complicated and consequently has such a problem that it can be applied to a base station, but is difficult to be applied to a terminal.

For this reason, in such a digital cellular system, the drift of the carrier frequency is specified as being 0.1 ppm or less (equivalent to a frequency of 95 Hz for the carrier frequency of 950 Hz. If the frequency doppler shifts as much as 220 Hz as in the above, not only is the bit error rate deteriorated, but it also becomes difficult to attain synchronization with the base station.

In addition, such a digital cellular system has a characteristic that the effect of doppler frequency shift becomes significant when external noise is low, in which there arises such a strange situation that the reception state is poor although sufficient field strength can be assured.

SUMMARY OF THE INVENTION

In view of the foregoing, an object of this invention is to provide a radio receiver which can correct doppler frequency shift with a simple arrangement.

The foregoing object and other objects of the invention have been achieved by the provision of a radio receiver 1 for receiving a predetermined received signal input through an antenna 2 and decoding radio transmitted data y comprising: a detector means 15 for detecting the received signal and generating a base band signal; an analog-to-digital convertor circuit 16 for sampling the base band signal at a predetermined cycle and sequentially outputting consecutive received data I and Q at the sampling cycle; a maximum likelihood determination circuit 25 to which the received data I and Q is sequentially input and which decodes the transmitted data y through most likelihood estimation; an estimated signal generator circuit 41, 43, 44, 45, or 47 which estimates received data I and Q corresponding to the transmitted data y in order to generate an estimated signal EXn, and generates a received estimated signal phase shifted by a predetermined amount from the estimated signal EXn or the received data I and Q; a branch metric detector circuit 42 which detects branch metric BM+, BM and BM− between the received estimated signal and the received data I and Q or between the estimated signal EXn and the received estimated signal to detect in correspondence to the phase shift 0, +Δ, or −Δ of the received estimated signal the first branch metric BM if the received data I and Q are in the same phase as the estimated signal EXn, the second branch metric BM+ if the estimated signal EXn is in a leading phase to the received data I and Q, or the third branch metric BM− if the estimated signal EXn is in a trailing phase to the received data X and Q; and a phase correction circuit 26, 43, 44, or 47 which detects the phase difference of the received data I and Q from the estimated signal EXn based on the comparison result of the first to third branch metric BM+, BM, and BM−, and corrects the phase difference of the received data I and Q based on said detected phase difference.

In the second invention, the estimated signal generator circuit 41, 43, 44, 45, or 47 generates the estimated signal EXn for every sample of the received data I and Q, the branch metric detector circuit 42 detects the first to third branch metrics BM+, BM, and BM− for every sample of the received data I and Q, and the phase correction circuit 26, 43, 44, or 47 corrects the phase difference in the received data I and Q for every sample of the received data I and Q.

In addition, in the third invention, the branch metric detector circuit 42 or 51 accumulates the first to third branch metrics BM+, BM and BM− of each received data I and Q by a predetermined number of samples of the received data I and Q, the phase correction circuit 26, 43, 44, or 47 detects the phase difference of the received data I and Q from the estimated signal EXn based on the accumulated first to third branch metrics so as to detect the phase difference of the received data I and Q from the estimated signal EXn based on the comparison result of the first to third branch metrics BM+, BM, and BM.

Furthermore, in the fourth invention, the maximum likelihood determination circuit 25 comprises a Viterbi equalizer.

Furthermore, in the fifth invention, the estimated signal generator circuit 41, 43, 44, 45, or 47 generates the estimated signal EXn by estimating the received data I and Q corresponding to the most probable path detected by the Viterbi equalizer 25.

The phase drift can be easily detected by utilizing the result of determination by the maximum likelihood determination circuit 25 with such an arrangement where the estimated signal EXn is generated by estimating the received data I and Q in correspondence to the transmitted data y estimated for the maximum likelihood sequence by the maximum likelihood determination circuit 25, where the first branch metric BM, if the received data I and Q is in the same phase as the estimated signal EXn, the second branch metric BM+, if the estimated signal EXn is in a leading phase to the received data I and Q, or the third branch metric BM−, if the estimated signal EXn is in a trailing phase to the received data I and Q, is detected, and then where the phase difference of the received data I and Q from the estimated signal EXn is detected based on the comparison result of the first to third branch metrics BM+, BM, and BM−. Thus, the doppler frequency shift can be corrected by correcting the phase difference of the received data I and Q based on the result of the phase difference detection.

In such a case, it is possible to correct the doppler frequency shift by generating the estimated signal EXn for every sample of the received data I and Q, detecting the first to third branch metrics BM+, BM, and BM−, and correcting the phase difference of the received data I and Q. It is also possible to correct the doppler frequency shift while effectively avoiding the effect of noise by detecting the phase difference of the received data I and Q based on the accumulation of the first to third branch metrics.

It is further possible to easily correct the doppler frequency shift by utilizing a Viterbi equalizer as the maximum likelihood determination circuit 25. In this case, the doppler frequency shift can be corrected by effectively utilizing the Viterbi equalizer 25 if the estimated signal EXn is generated by estimating the received data I and Q so as to correspond to the most probable path detected by the Viterbi equalizer 25.

According to this invention, a radio receiver which can easily correct the doppler frequency shift can be obtained by generating the estimated signal of the received data in correspondence to the maximum likelihood estimated transmitted data, by detecting the branch metric in which the estimated data is in phase with the received signal, or in the leading or trailing phase to the received signal, respectively, and by correcting the phase difference based on the result of detection of the phase difference.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) FIRST EMBODIMENT (1—1) General Configuration of the Embodiment

Figure 2:
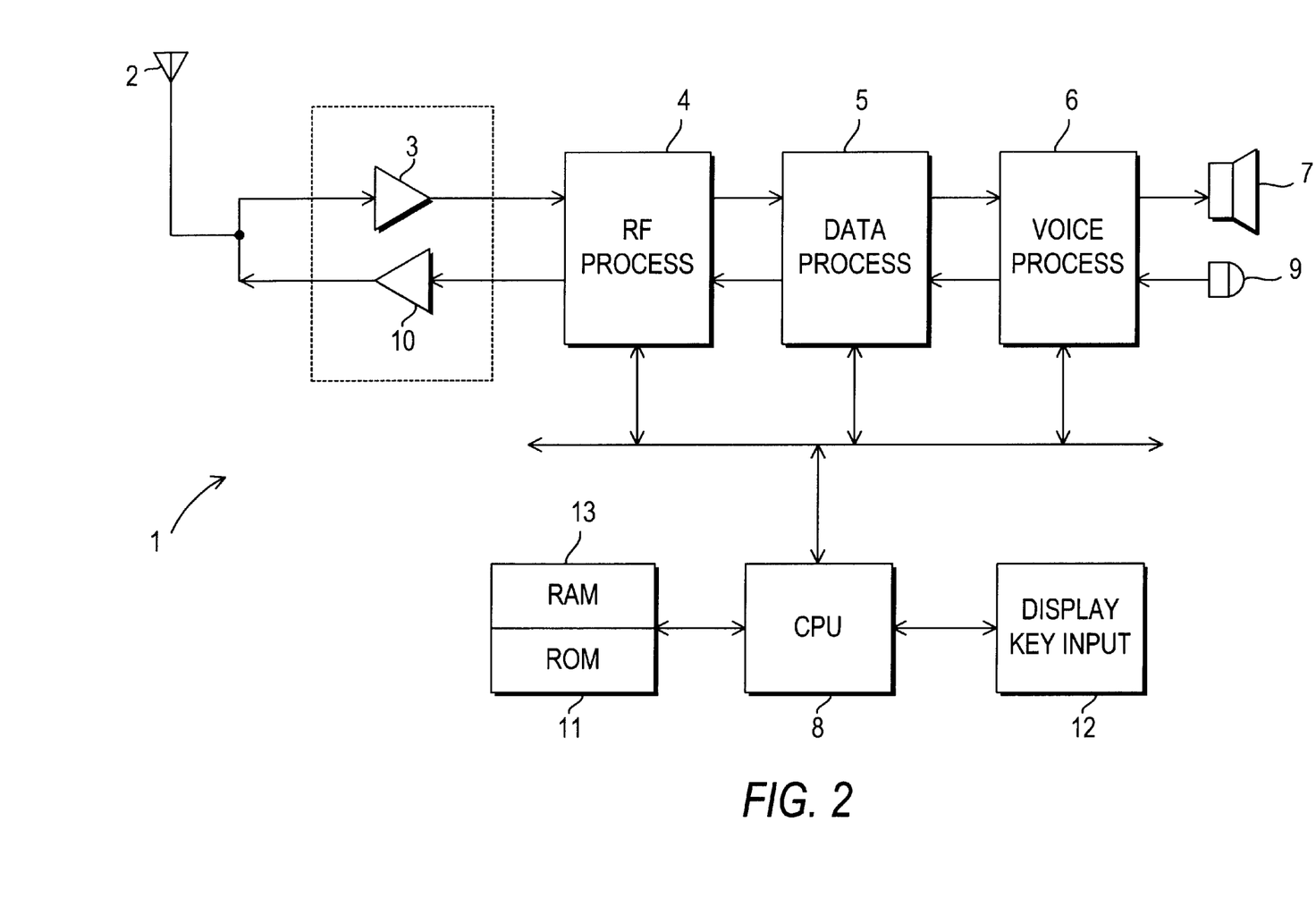
FIG. 2 is a block diagram illustrating a terminal of digital cellular according to one embodiment of this invention.

Referring to FIG. 2, 1 generally denotes a terminal of a digital cellular system, which receives a transmitted signal sent out from a base station with its antenna 2, and outputs the received signal thus obtained to an amplifier circuit 3 through an antenna connecting device (not shown).

In this case, the amplifier circuit 3 amplifies the received signal with a predetermined gain, and then outputs it to an RF processing circuit (RF processor) 4. The RF processing circuit 4 frequency converts the received signal by using a predetermined local oscillation signal, the terminal 1 thereby being arranged so as to selectively receive a desired channel by switching the frequency of the local oscillation signal.

Moreover, the RF processing circuit 4 orthogonally detects the frequency converted received signal to demodulate an I signal which is in synchronization with the reference phase of the received signal, and to demodulate a Q signal. It samples these I and Q signals in its built-in analog-to-digital convertor circuit at a predetermined cycle to convert them to digital values.

Thus, the terminal 1 demodulates I data consisting of a result of demodulation corresponding to the reference phase of the received signal, and Q data, and outputs these I and Q data to a data processing circuit 5.

The data processing circuit 5 is composed of a digital processor which processes the I and Q data, and is designed to demodulate original differential coded data from the I and Q data. At the moment, it outputs the differential coded data after waveform equalization and correction of distortion by a built-in Viterbi equalizer so as to reduce the effects of fading and multipath.

In addition, at the moment, the data processing circuit 5 detects FCCH with reference to the I and Q data, and detects a frequency error based on the result of detection. This result of detection is used as a reference to control operations of the data processing circuit 5, a predetermined reference signal generator circuit, or the like, thereby attaining frame synchronization with the base station and correcting the frequency drift of the internal clock to the base station.

In addition to the system of processing, the data processing circuit 5 differential decodes the differential coded data, then processes error correction, and selectively outputs the decoded data thus obtained to a voice processing circuit 6 or a central processing unit (CPU) 8.

Here, the voice processing circuit 6 decodes voice data by voice expanding the decoded data, and converts the voice data into a voice signal by a built-in digital-to-analog convertor circuit. The voice processing circuit 6 also drives a speaker 7 with the voice signal, thereby the terminal 1 being capable of receiving the voice signal of a caller sent out from the base station.

On the other hand, the central processing unit 8 is designed to receive predetermined information sent out from the base station based on the decoded data, to switch the frequency of a local oscillating signal based on the result of reception, the transmission/receiving frequency thereby being switched to a predetermined speech channel, and the terminal 1 thereby being capable of transmitting/receiving voice signals by selecting a predetermined speech channels.

On the other hand, the transmission system of the terminal 1 converts voice signals output from a microphone 9 into voice data with the voice processing circuit 6, and then voice compresses them.

The data processing circuit 5 performs differential coding on the output data of the voice processing circuit 6 by adding error correction codes, as well as performs differential coding on various control codes output from the central processing unit 8 in place of the output from the voice processing circuit 6 by adding error correction codes.

The RF processing circuit 4 generates a transmitting signal by GMSK modulating the differential coded data output from the data processing circuit 5, and frequency converts the transmitting signal into a predetermined frequency.

In addition, the RF processing circuit 4 outputs the frequency converted transmitting signal to the antenna 2 through the amplifier circuit 10, thereby the terminal 1 being capable of transmitting voice signals of a caller or calling signals to the base station.

At this time, the terminal 1 switches the timing for transmission and reception based on a predetermined detection result detected by the data processing circuit 5. Thus, by applying the time division multiplex approach, it can selectively receive a time slot assigned to it from signals transmitted to a plurality of terminals from the base station, and can transmit voice data or the like to the base station by selectively using the time slot assigned to it.

To this end, the central processing unit 8 is designed to execute a processing program stored in a read-only memory circuit (ROM) 11 by assuring a work area in a random access memory (RAM) 13, thereby controlling the operation of the entire system by outputting control codes to each circuit block as required. For example, when a predetermined operator on a display/key input section 12 is pressed, a calling signal is sent out to the base station in response to such an operation, and when a calling signal from the base station enters, the receiving channel or the like is switched.

(1-2) Processing of Input Data

Figure 3:
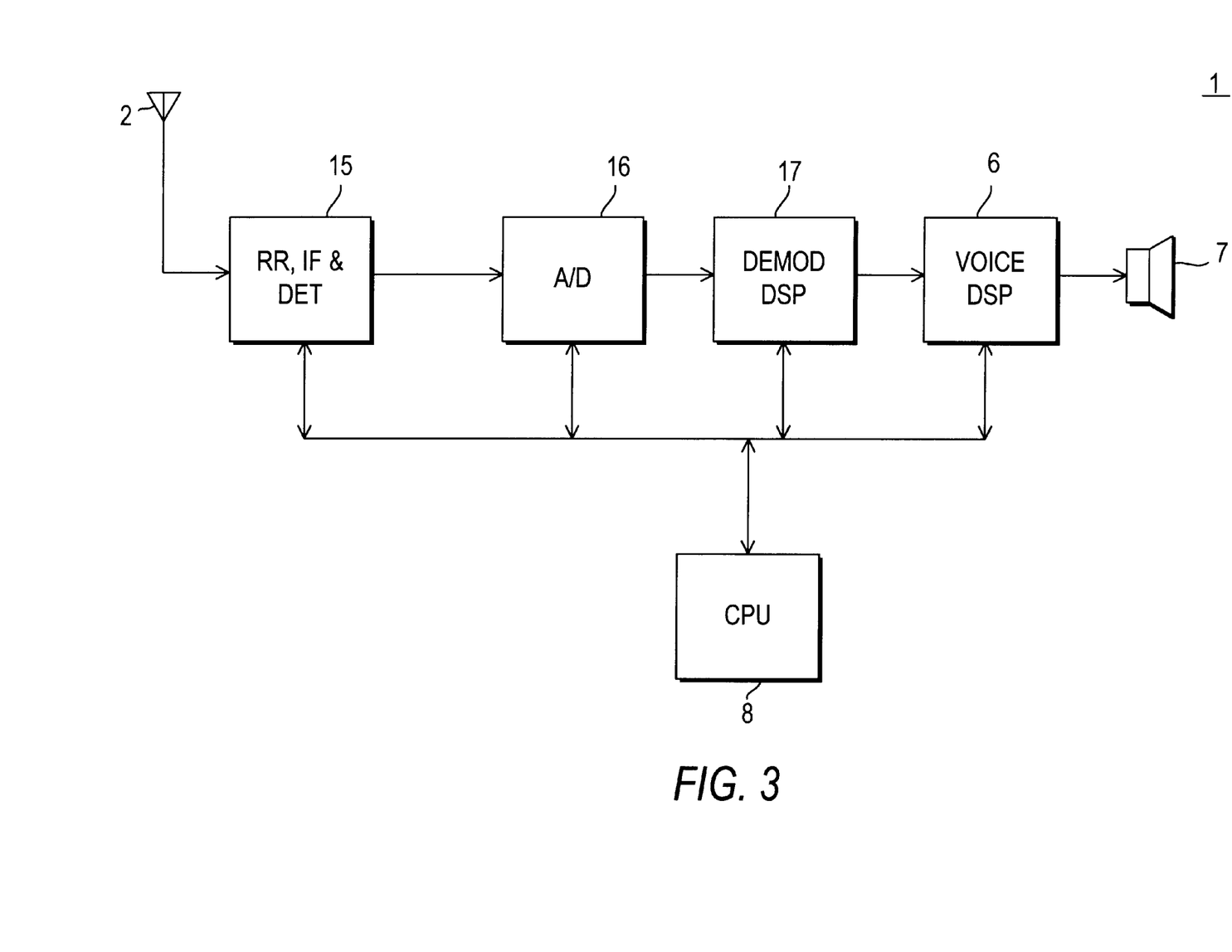
FIG. 3 is a block diagram for explaining its receiver section.

Here, the terminal 1 has received a signal transmitted from the base station with its receiving system as shown in FIG. 3.

That is, the terminal 1 constitutes the RF processing circuit 4 with a selector circuit (RF), an intermediate frequency circuit (IF), and a detector circuit (all of which are denoted by a reference 15), and the analog-digital convertor circuit 16. The analog-digital convertor generates I and Q data.

On the other hand, the data processing circuit 5 decodes the I and Q data to the original data stream with its built-in demodulator (DEMOD) and digital signal processor (DSP) (which are denoted by a reference 17).

At the moment, the digital signal processor detects FCCH based on the I and Q data, and performs equalization of the received signal and error correction to the decoded data stream.

On the other hand, the voice processing circuit 6 is composed of a digital signal processor for processing voice data (VOICE DSP) in which the output data from the data processing circuit 5 is data expanded so that the voice compressed transmitted data is voice expanded and converted into the original data stream. The data stream is converted into analog signals to drive the speaker 7.

(1-3) Equalizer

When the data thus received is processed, the data processing circuit 5 converts the I and Q data into differential coded data y in the built-in Viterbi equalizer by applying a Viterbi algorithm.

Figure 4:
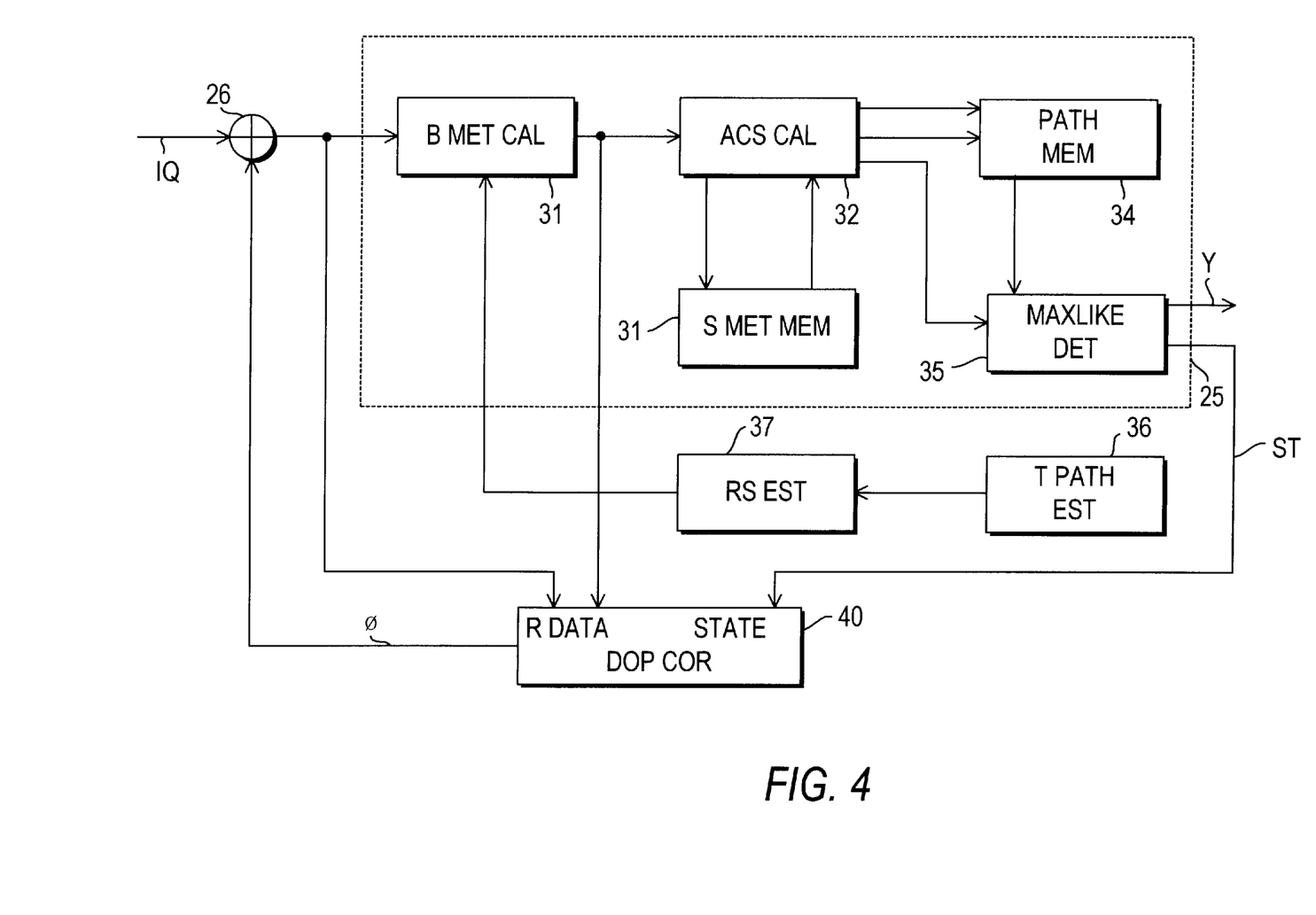
FIG. 4 is a block diagram illustrating its data processing section.

That is, as shown in FIG. 4, the equalizer 25 inputs the I and Q data to a branch metric calculation circuit 31 through a phase shifter 26, in which branch metric BM is generated from the I and Q data.

An ACS (add compare select) calculation circuit 32 accumulates the branch metric for each path to generate state metric, and selects a path for the differential coded data y based on the comparison result of the state metric.

In this case, the Viterbi equalizer 25 sets the state of the differential coded data y to the 32-state, estimates the condition of the transmission path with a transmission path estimator 36, and generates a estimated signal corresponding to the I and Q data at each state with a received signal estimating circuit 37.

This causes the branch metric calculation circuit 31 to calculate the following equation between each estimated signal En (EIn, EQn) and the corresponding I and Q data (In, Qn), and detects the branch metric BM for each state.

$$BM = (In - EIn)^2 + (Qn - EQn)^2 \qquad (3)$$

On the other hand, the ACS calculation circuit 32 accumulates and adds the branch metric BM in correspondence to the 32-state from the current states stored in a state metric memory 33, whereby a state metric is generated by accumulating the branch metric BM for each path from the current state to the 32-state.

In addition, the ACS calculation circuit 32 selects the state metric with smaller value with respect to respective state metrics thus generated.

Thus, the ACS calculation circuit 32 sets subsequent states according the detected path, and also stores the detected state metric in the state metric memory 33.

This causes the Viterbi equalizer 25 to sequentially select the most probable path for the I and Q data sequentially input by repeating the processing procedures, and to store the result of path selection in a path memory 34 together with the state metric for the applicable path.

Furthermore, the equalizer 25 sets the reliability and the soft determination level of the differential coded data y with the maximum likelihood determination circuit 35 based on the result of the path selection stored in the path memory 34, whereby the signal is demodulated by applying the algorithm of maximum likelihood sequence estimation.

In the processing procedures, the data processing circuit 5 estimates doppler frequency shift by using a doppler correction circuit 40, and corrects the phase of following input I and Q data based on the result of estimation thereby correcting the doppler frequency shift.

Figure 5:
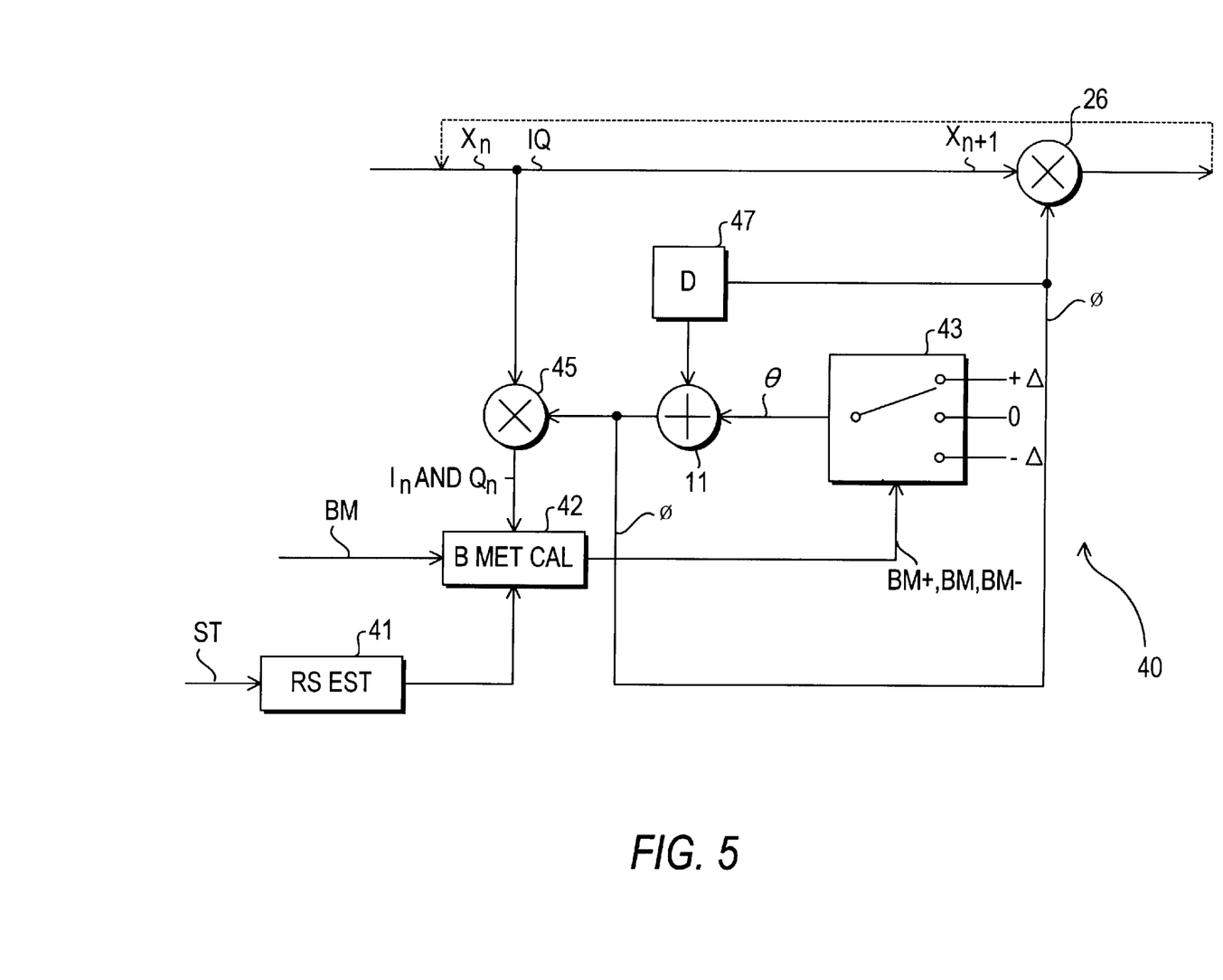
FIG. 5 is a block diagram illustrating its doppler correction circuit.

That is, as shown in FIG. 5, the doppler correction circuit 40 inputs state information ST detected by the Viterbi equalizer 25 (namely, representing a state derived from the result of path selection) into a received signal estimating circuit 41 where an estimated signal of the I and Q data corresponding to this state is generated.

The branch metric circuit 42 generates branch metric BM+ and BM− for a case where the I and Q data phase shift to a positive side or a negative side between this estimated signal and the IQ data, respectively, and outputs the branch metric BM detected by the Viterbi equalizer and this branch metric BM+ or BM− to a succeeding selector circuit 43.

Thus, the doppler correction circuit 40 is designed to detect the branch metric BM+ and BM− where the phase further changes from the state estimated for the maximum likelihood by the Viterbi equalizer 25, and the branch metric where the phase does not change.

In this case, the selector circuit 63 selects and outputs preset phase data +Δ, 0, and −Δ by sequentially switching contacts. An adder circuit 44 adds this phase data θ to the previous phase difference φ' to form a phase error φ.

A multiplier circuit 45 performs multiplication between this phase error φ and the I and Q data to execute the calculation expressed by the following equation:

$$Xn' = \begin{bmatrix} In' \\ Qn' \end{bmatrix} = \begin{bmatrix} \cos\phi & -\sin\phi \\ \sin\phi & \cos\phi \end{bmatrix} \begin{bmatrix} In \\ Qn \end{bmatrix} \qquad (4)$$

Thus, multiplier 45 generates the first I and Q data, In and Qn (where n=1), which is the I and Q data phase changed by the previous phase error φ', the second I and Q data, In and Qn (where n=2), which is the first I and Q data displaced by the phase difference Δ to the leading side from In and Qn, and the third I and Q data, In and Qn (where n=3), which is the first I and Q data displaced by phase difference −Δ to the trailing side from In and Qn.

The branch metric calculation circuit 62 generates the branch metric BM+ and BM− in a case where the I and Q data is phase shifted to the leading and the trailing sides, respectively, by calculating the equation (3) between the second and third I and Q data, and the estimated signal output from the received signal estimating circuit 41, respectively (in this case, the estimated signal corresponds to EIn and EQn).

Furthermore, in this case, the branch metric calculation circuit 42 utilizes the branch metric BM detected by the Viterbi equalizer to output this branch metric BM to the selector circuit 43 as a branch metric BM when phase is not shifted, thereby simplifying the entire calculation.

The selector circuit 43 selects the one with the minimum value from these three branch metric BM+, BM, and BM−, and selectively outputs the phase data θ corresponding to the selected branch metric.

That is, when the distance is short between the estimated signal and the I and Q data, the value of branch metric becomes lower by that amount so that the I and Q data is more probable by that amount.

Thus, for the branch metric obtained with the estimated signal by phase shifting the IQ data by +Δ, 0 and −Δ, the branch metric corresponding to the I and Q data which have the shortest distance to the estimated signal after phase shift has the minimum value.

Thus, the phase difference can be corrected by phase rotating the I and Q data by the phase difference corresponding to the branch metric with the minimum value.

Thus, it is appreciated that a sequentially changing phase difference can be easily corrected by sequentially repeating this processing to the consecutive I and Q data, whereby the doppler shift can also be corrected.

Furthermore, it is appreciated that, even when there is a drift of, for example, the frequency of internal clock to a base station other than the doppler frequency shift, it can be easily corrected.

Thus, the adder circuit 44 adds the phase data θ selectively output from the selector circuit 43 to the phase difference φ, and then outputs to the phase shifter 26 which in turn performs the calculation of the equation (4) on the succeeding I and Q data Xn+1 by using this phase data θ to correct the phase difference.

Thus, the data processing circuit 5 detects a state and branch metric by performing the maximum likelihood sequence estimation on the succeeding IQ data Xn+1 with the Viterbi equalizer. The doppler correction circuit 40 detects the phase difference φ of the I and Q data Xn+1 based on the result of this detection. The phase difference is detected for every bit by repeating this series of processing to sequentially perform the correction.

In this embodiment, the phase shifter 26 is designed to also be used for correcting a frequency error based on the FCCH. Thus, the data processing circuit is designed to simplify the entire arrangement by sharing this phase shifter 26.

A delay circuit (D) 47 delays phase data θ output to the phase shifter 26 by one sampling cycle, and outputs it to the adder circuit 44, thereby adding the previous phase difference φ to the phase data θ of the succeeding I and Q data.

Thus, the terminal 1 easily corrects the doppler frequency shift by effectively utilizing the result of processing of the Viterbi equalizer 25 so that the doppler frequency shift can be corrected with a simple arrangement while effectively avoiding increase of power consumption by that amount, and the bit error rate is improved so as to efficiently perform decoding in the following decoding processing.

Figure 6:
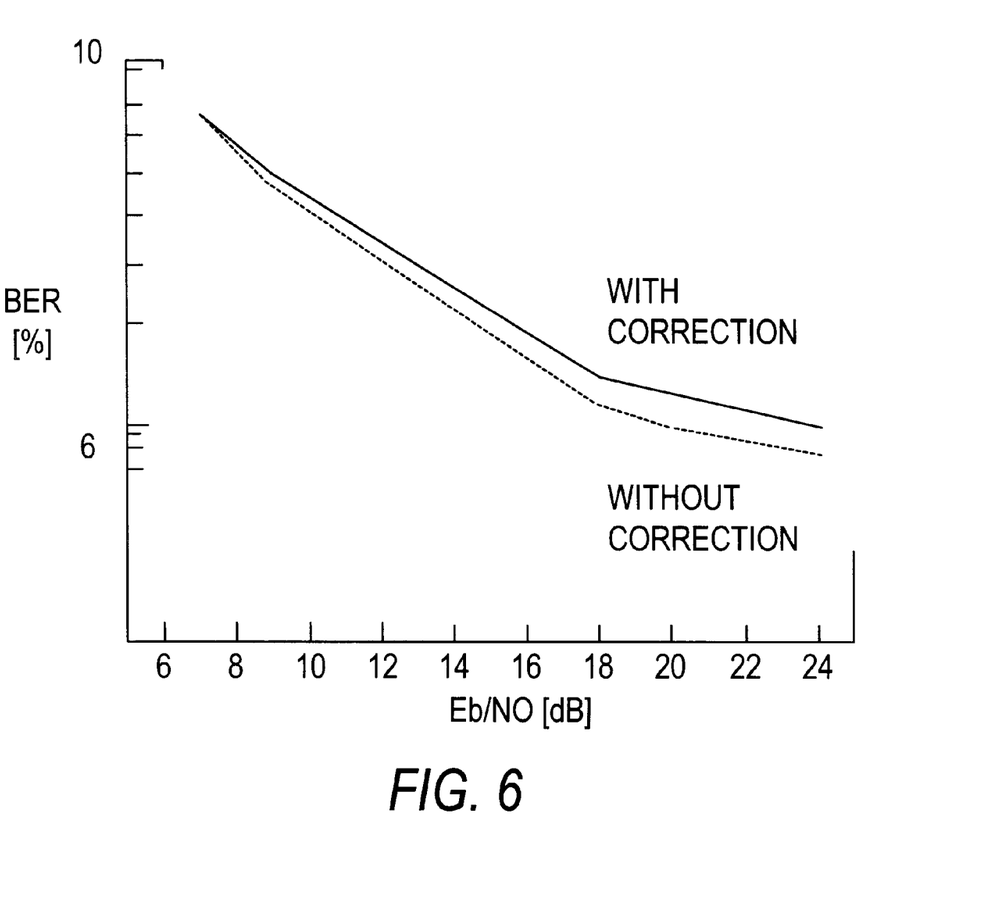
FIG. 6 is a characteristic curve illustrating the result of its simulation.

Actually, as shown in FIG. 6, simulation revealed that the bit error rate BER can be improved.

It was found that the efficiency was significantly improved in a case where there was a little noise or the Eb/NO was large through a simulation on a fading model where the terminal 1 moved in a country zone at a speed of 250 km/h.

(1-4) Advantage of the Embodiment

According to the above-mentioned arrangement, the doppler frequency shift can be corrected by detecting the branch metric at the phase difference based on the result of detection of the Viterbi equalizer, by correcting the phase difference based on the result of detection, and by repeating the processing procedures for all I and Q data.

(2) SECOND EMBODIMENT

Figure 7:
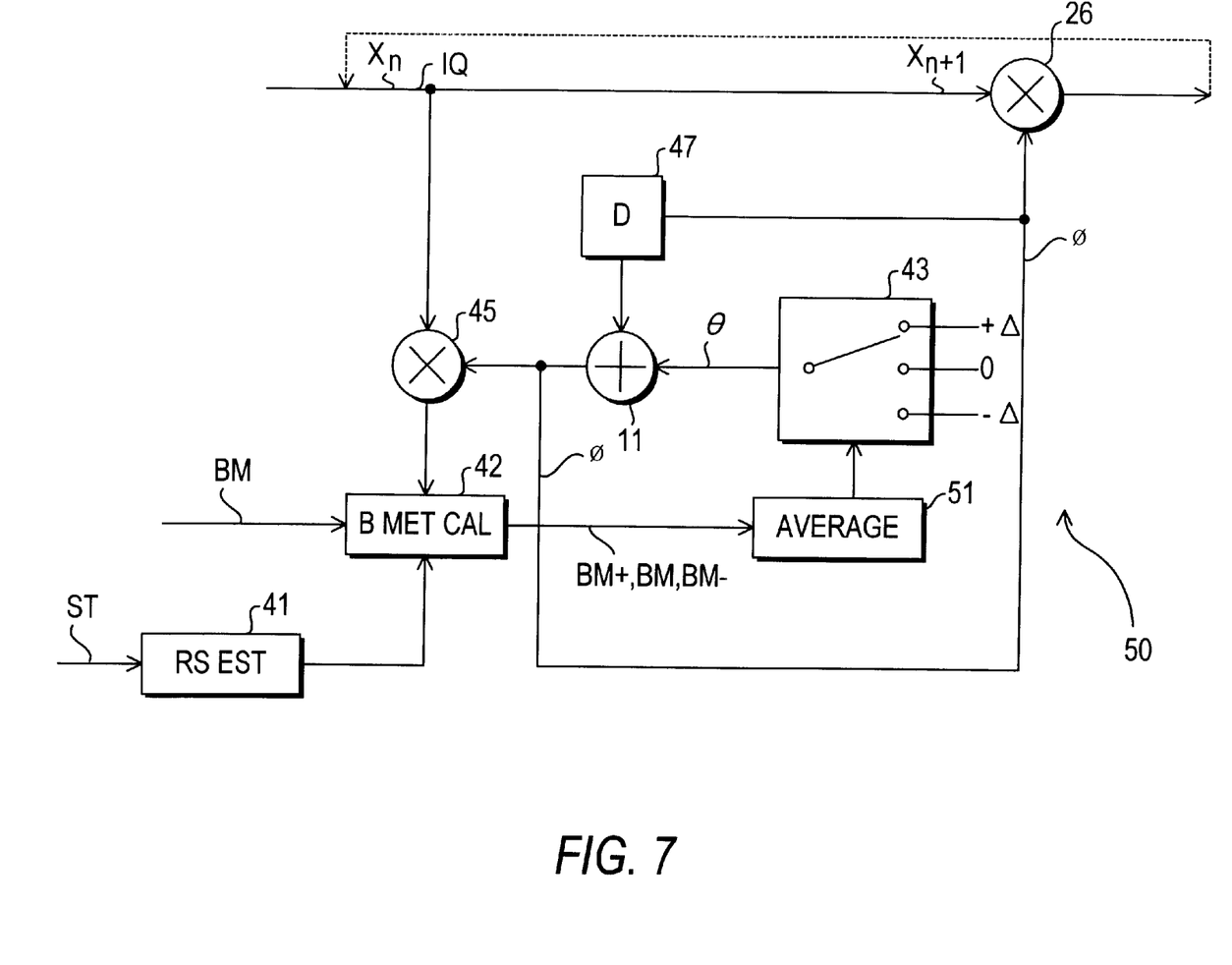
FIG. 7 is a block diagram illustrating a doppler correction circuit according to a second embodiment.

In this embodiment, the doppler frequency shift is corrected by the doppler correction circuit 50 shown in FIG. 7.

That is, the doppler correction circuit 50 inserts an averaging circuit 51 between the branch metric calculation circuit 42 and a selector circuit 63. The averaging circuit 51 adds each branch metric of BM+, BM, and BM- for a predetermined number of samples.

Thus, the averaging circuit 51 outputs the result of this addition to the selector circuit 43, which selects the addition result with the minimum value and selectively outputs corresponding phase data +Δ, 0 or -Δ.

Thus, the doppler correction circuit 50 can detect the phase difference by averaging the branch metric BM+, BM, and BM- so that it can reliably correct the doppler frequency shift while effectively avoiding effect of noise or the like. Furthermore, the entire amount of processing can be reduced by the amount of averaging.

According to the arrangement shown in FIG. 7, similar to the affect attained by the first embodiment can be obtained even if it is arranged to correct the phase difference based on the result of averaging of the branch metric when the phase is drifted. In addition, the doppler frequency shift can be reliably corrected while effectively avoiding the effects of noise or the like.

(3) THIRD EMBODIMENT

Figure 8:
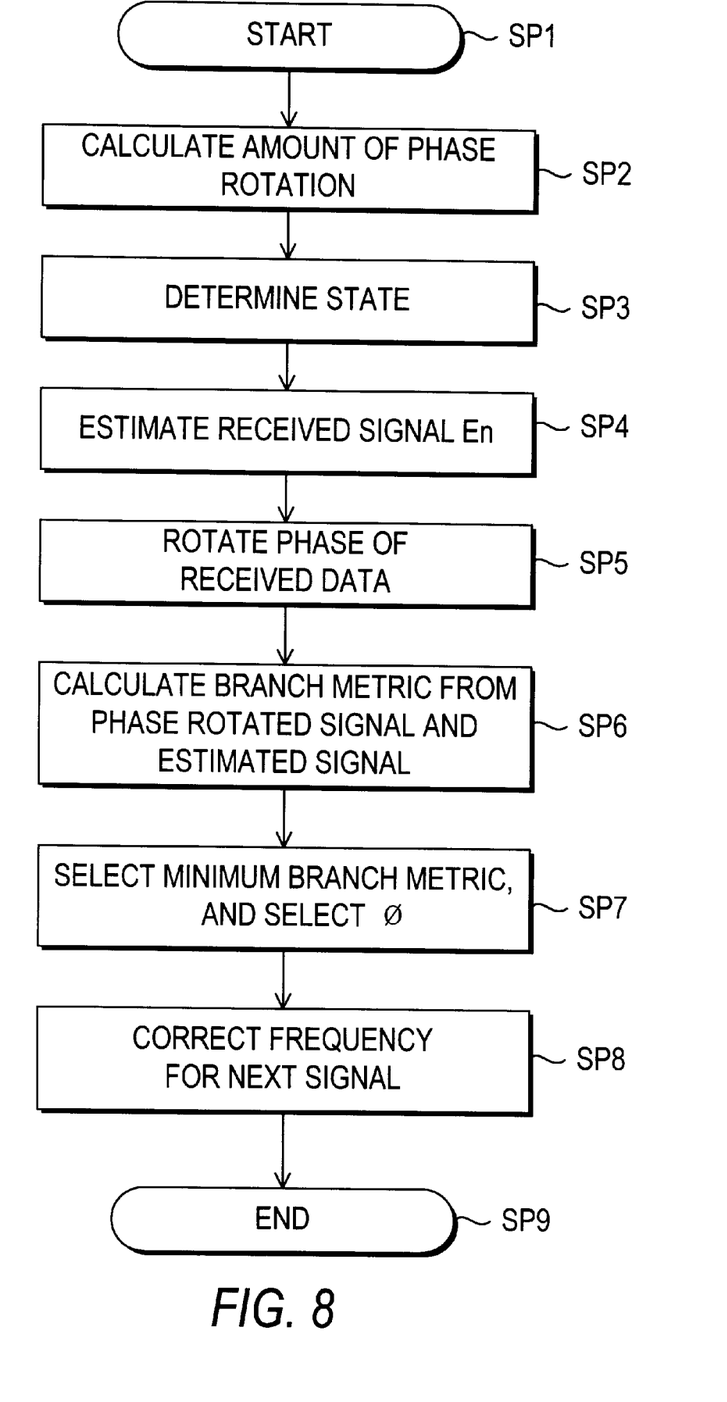
FIG. 8 is a flowchart for explaining the operation of a doppler correction circuit according to the third embodiment of this invention.

In this embodiment, the doppler frequency shift is corrected by repeating the processing procedure shown in FIG. 8 on the digital signal processor incorporated in the data processing circuit 5.

In this case, the digital signal processor first sets the variables necessary for this correction processing to initial values, and then starts the processing procedure.

That is, the digital signal processor enters from the step SP1 to the step SP2 where the phase data +Δ, 0, and -Δ are added to their respective previous phase error φ to form three different phase errors φ.

Then, the digital signal processor proceeds to the step SP3 to detect a state determined by the Viterbi equalizer, and then, in the succeeding step SP4, to generate estimated signals En from this state and three phase errors φ.

In step SP5, the I and Q data are phase shifted, or phase rotated, as by multiplier 45 of FIG. 5. Then, in the succeeding step SP6, the digital signal processor uses the phase-rotated data to generate the branch metric BM+, BM, and BM- for all estimated signals En, and in the succeeding step SP7, detects the branch metric with the minimum value.

In addition, the digital signal processor detects the corresponding phase difference from the detected branch metric, and, in the succeeding step SP8, corrects the I and Q data Xn+1 with this phase difference, and proceeds to the step SP9 to terminate the processing procedure.

The processing procedure shown in FIG. 8 may utilize and execute a subroutine program for the processing by the Viterbi equalizer, as required, so that the digital signal processor can correct the doppler frequency shift with a simple program.

According to the arrangement shown in FIG. 8, an effect similar to that attained by the first embodiment can be obtained even if it is arranged to correct the phase difference by obtaining the branch metric with the calculation when the phase is drifted.

(4) OTHER EMBODIMENTS

Although the above embodiments are described for a case where the maximum likelihood is estimated by applying the Viterbi equalizer, this invention is not limited to such a case, but may be extensively applied to such cases where various maximum likelihood estimation algorithms are applied to equalize the waveform.

In addition, although the above embodiments are described for a case where decoding is performed by further differentiating the output data of the equalizer 25, this invention is not limited to such a case, but may be extensively applied to such cases where this output data is directly output.

Furthermore, although the above embodiments are described for a case where the branch metric is detected by shifting the I and Q data by the multiplier circuit 45, this invention is not limited to such a case, but the branch metric may be detected by shifting the estimated signal EXn in place of the I and Q data.

Furthermore, instead, the estimated signal phase rotated in advance may be directly generated.

Furthermore, although the above embodiments are described for a case where the branch metric is detected by calculating the equation (4), this invention is not limited to such cases, but the branch metric BM may be detected by calculating the following equation in place of the equation (4):

$$BM=|In-EIn|+|Qn-EQn| \qquad (5)$$

With such an arrangement, the branch metric BM can be detected easier than in a case where the sum of square is detected by the equation (4) so that the entire processing can be simplified.

Furthermore, although the above embodiments are described for a case where the doppler correction processing is executed bit by bit, this invention is not limited to this, but may execute the doppler correction at intervals of several bits. In this connection, when the doppler correction is executed at intervals of several bits, this invention may average by summing the Δθ during those intervals. Thereby, the same effects can be realized same as the above embodiments.

Furthermore, although the above embodiments are described for a case where the state of the differential coded data y is set to the 32-state, this invention is not limited to such a case, but may be extensively applied to such cases where demodulation is performed by setting the state to various values, as required.

Furthermore, although the above embodiments are described for a case where the branch metric is detected for a case where there is no phase difference, a case where the phase is drifted to the leading side, and a case where it is drifted to the trailing side, this invention is not limited to such cases, but the branch metric may be detected by further finely dividing the amount of phase shift, as required.

Furthermore, although the above embodiments are described for a case where this invention is applied to a terminal of the digital cellular system, it can be extensively applied to a radio apparatus transmitting differential coded data, a reproducing apparatus decoding desired data by using a transmission path consisting of a recording/reproduction system, or the like.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A radio receiver for receiving a predetermined received signal input through an antenna and decoding radio transmitted data, comprising:

detector means for detecting said received signal and generating a base band signal;

an analog-to-digital convertor circuit for sampling said base band signal at a predetermined cycle and sequentially outputting consecutive received data at the sampling cycle;

a maximum likelihood determination circuit for sequentially inputting said received data, and decoding said transmitted data through the most likelihood estimation;

an estimated signal generator circuit for estimating said received data corresponding to said transmitted data to generate a received estimated signal phase shifted by a predetermined amount from said received data;

a branch metric detector circuit for detecting branch metric between said received estimated signal and said received data to detect in correspondence to the phase shift of said received estimated signal a first branch metric if said received data is in the same phase as said estimated signal, a second branch metric if said estimated signal is in a leading phase to said received data, or a third branch metric if the estimated signal is in a trailing phase to said received data; and a phase correction circuit for detecting a phase difference between said received data and said estimated signal based on the comparison result of the first to third branch metrics and correcting the phase difference of said received data based on said detected phase difference.

2. A radio receiver according to claim 1, wherein:

said estimated signal generator circuit, generates the estimated signal EXn for every sample of the received data;

said branch metric detector circuit detects the first to third branch metrics for every sample of the received data;

said phase correction circuit corrects the phase difference in the received data for every sample of the received data.

3. A radio receiver according to claim 1, wherein:

said branch metric detector circuit accumulates said first to third branch metrics of each received data by a predetermined number of samples of said received data;

said phase correction circuit detects the phase difference between said received data and said estimated signal based on said accumulated first to third branch metrics so as to detect the phase difference between said received data and said estimated signal based on the comparison result of said accumulated first to third branch metrics.

4. A radio receiver according to claim 1, wherein:

said maximum likelihood determination circuit comprises a Viterbi equalizer.

5. A radio receiver according to claim 4, wherein:

said estimated signal generator circuit generates said estimated signal by estimating said received data corresponding to the most probable path detected by said Viterbi equalizer.

* * * * *